(12) United States Patent
Zhang et al.

(10) Patent No.: US 7,477,875 B2
(45) Date of Patent: Jan. 13, 2009

(54) BUILT IN LOOP BACK SELF TEST IN DESIGN OR ON TEST BOARD FOR TRANSCEIVERS

(75) Inventors: Lianrui Zhang, Plano, TX (US); Charles Weinberger, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 720 days.

(21) Appl. No.: 11/189,420

(22) Filed: Jul. 26, 2005

(65) Prior Publication Data

US 2007/0026809 A1 Feb. 1, 2007

(51) Int. Cl.
*H04B 17/00* (2006.01)
(52) U.S. Cl. .............. 455/67.11; 455/67.14; 455/115.1; 455/226.1; 714/733
(58) Field of Classification Search .............. 455/115.1, 455/115.2, 67.11, 67.14, 69, 226.1, 227, 455/230, 9, 10, 501; 514/712, 724, 715, 514/721, 733
See application file for complete search history.

(56) References Cited

U.S. PATENT DOCUMENTS

| | | | | |
|---|---|---|---|---|
| 5,581,190 | A * | 12/1996 | Herring et al. | 324/605 |
| 6,175,555 | B1 * | 1/2001 | Hoole | 370/280 |
| 7,340,219 | B2 * | 3/2008 | Heaton et al. | 455/67.11 |
| 2002/0087924 | A1 * | 7/2002 | Panis et al. | 714/712 |
| 2005/0172181 | A1 * | 8/2005 | Huliehel | 714/724 |
| 2006/0141937 | A1 * | 6/2006 | Creigh | 455/67.11 |

* cited by examiner

*Primary Examiner*—Sujatha Sharma
(74) *Attorney, Agent, or Firm*—William B. Kempler; W. James Brady, III; Frederick J. Telecky, Jr.

(57) ABSTRACT

In a method and system for testing a transceiver communication device operating in a test mode, a transmitter output signal generated by a transmitter is adjusted and provided as a loop back to a receiver. The adjustment includes shifting a frequency and attenuating amplitude of the transmitter output signal to substantially match a predefined frequency and a predefined amplitude of a receiver input signal received by the receiver. A pass or fail status of the device is determined by comparing transmitted and received data.

20 Claims, 3 Drawing Sheets

BUILT IN LOOP BACK SELF TEST IN DESIGN OR ON TEST BOARD FOR TRANSCEIVERS

BACKGROUND

The present disclosure relates generally to the testing of integrated circuits (ICs), and more particularly to an improved system and method for testing wireless communication devices.

Manufacturers of electrical/electronic devices such as ICs, radio frequency (RF) circuit devices, printed circuit boards, and other electronic circuits, typically use automatic test equipment (ATE) or similar other test systems to test the devices during the production process. The test systems are generally configured to apply a test signal to the device and measure its response to determine a pass or fail status. A device under test (DUT) is typically mounted on a test board, which in turn is secured to a test head. Test signals generated by the test system are communicated to the DUT via the test head and the test board.

Presently, use of wireless communication technology has experienced a rapid growth since the wireless technology when used with portable electronic devices combine information accessibility with user mobility and convenience. Many of these portable devices such as notebook/pocketbook computers, personal entertainment devices, and personal communications devices or a combination thereof typically use various wireless communication devices such as radios and wireless network interface cards (NIC's) to communicate between themselves and/or with other wired or wireless networks, including intranets and the Internet.

Multiple technological standards may be adopted for use in wireless media applications. For example, IEEE 802.11, Bluetooth, Global System for Mobile Communications (GSM), and Infrared Data Association (IrDA) are widely accepted standards for wireless communications. Regardless of the standard used, wireless devices typically operate in certain predefined frequency spectrum.

A mixed signal ATE tester having an RF signal source is typically deployed in a production environment to test a DUT with RF devices, such as RF transmitters, receivers and/or transmitters/receivers combined into one unit, which may also be referred to as 'transceivers'. Such mixed signal ATE testers, however, are generally expensive to procure and maintain due to the complexity of the ATE system resulting from performing ongoing upgrades, calibration and maintenance. The cost of these testers adds significantly to the cost of testing each integrated circuit (IC) which reduces the profit margin of the IC. In addition, such testers may provide a limited throughput for RF signals and may not support simultaneous testing of multiple DUT's, thereby limiting production throughput.

Therefore, a need exists to provide an improved method and system for testing wireless semiconductor devices. Specifically, there is a need for simultaneously testing multiple DUT's such as transceivers without deploying expensive ATE testers having an RF signal source. Accordingly, it would be desirable to provide an efficient method and system for testing wireless devices, absent the disadvantages found in the prior techniques discussed above.

SUMMARY

The foregoing need is addressed by the teachings of the present disclosure, which relates to an improved method and system for testing wireless semiconductor devices. According to one embodiment, in a method and system for testing a transceiver communication device operating in a test mode, a transmitter output signal generated by a transmitter is adjusted and provided as a loop back to a receiver. The adjustment includes shifting a frequency and attenuating amplitude of the transmitter output signal to substantially match a predefined frequency and a predefined amplitude of a receiver input signal received by the receiver. A pass or fail status of the device is determined by comparing transmitted and received data.

In one aspect of the disclosure, a method of testing a transceiver device having a transmitter and a receiver includes receiving an input to place the device in a test mode. Placing the device in the test mode enables a loop back of a transmitter output signal to a receiver input signal. The transmitter output signal is converted to substantially match the receiver input signal having a predefined frequency and a predefined amplitude. The loop back is completed by providing the receiver input signal having the predefined frequency and the predefined amplitude to the receiver. A pass or fail status of the device is determined by comparing transmitted and received data.

In another aspect of the disclosure, a test system for testing a device under test (DUT) includes a tester to provide a plurality of test signals. The DUT receives the plurality of test signals to test the device. The DUT includes a transmitter for providing a transmitter output signal and a receiver for receiving a receiver input signal having a predefined frequency and amplitude. The test system includes a loop back circuit to couple an output of the transmitter to an input of the receiver for performing the test. The loop back circuit receives the transmitter output signal and receives a local oscillator signal generated on a test board to provide the receiver input signal having the predefined frequency and amplitude. A pass or fail status of the device is determined by comparing transmitted and received data.

Several advantages are achieved by the method and system for testing wireless devices according to the illustrative embodiments presented herein. The embodiments advantageously provide for self testing transceiver devices without deploying expensive ATE testers having an RF test signal source, thereby making the test quicker and more cost effective in a semiconductor manufacturing environment. In addition, the embodiments advantageously enable manufacturers of ICs to simultaneously test multiple transceiver devices thereby improving the production throughput.

DETAILED DESCRIPTION

Figure 1:
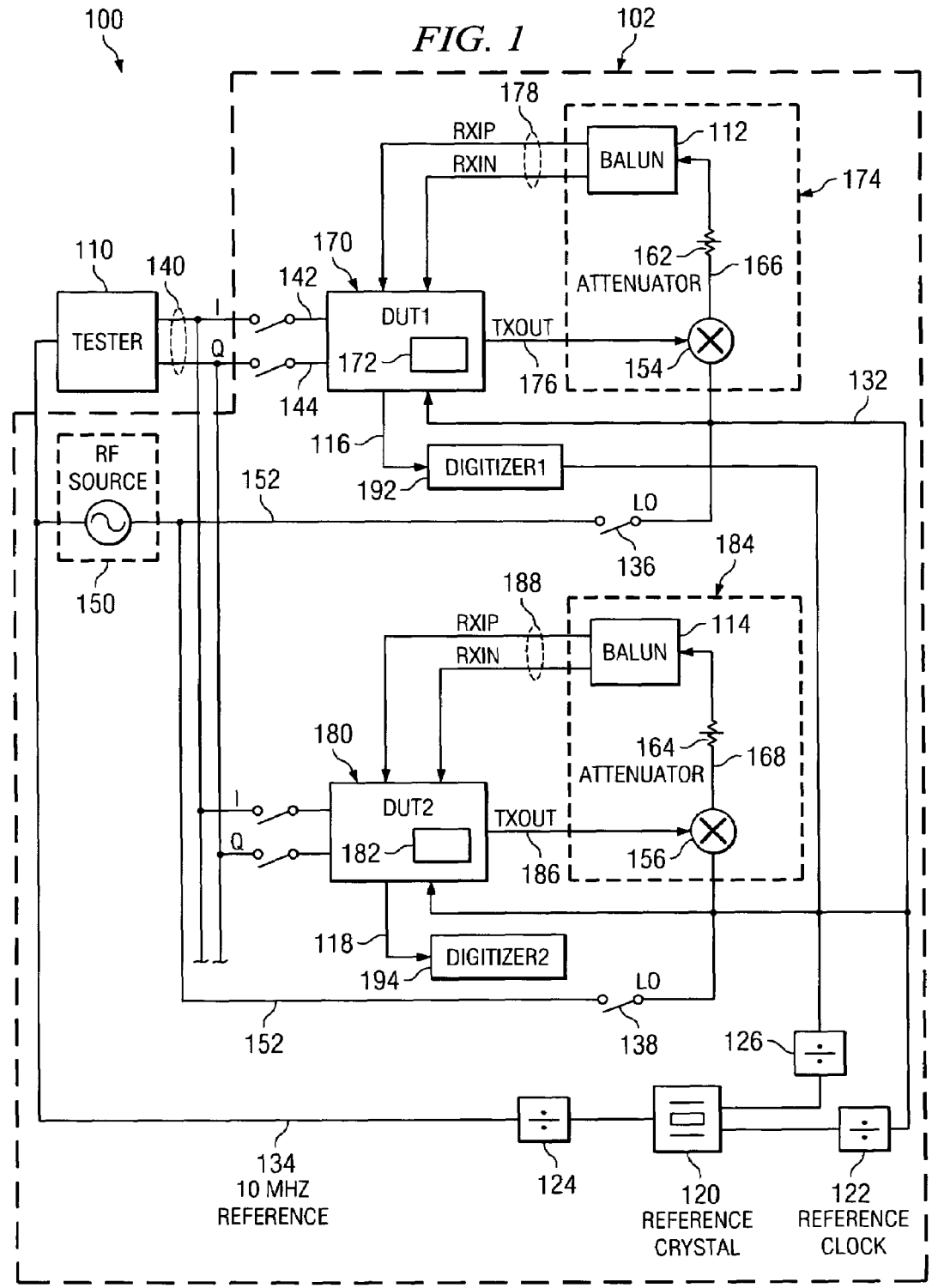
FIG. 1 illustrates a block diagram of a test system 100, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

Many traditional techniques for testing wireless devices such as transceivers often utilize expensive RF testers. The high initial cost of ATE testers having RF signal source, the elaborate test system set up and preparation time and the slow throughput of the test system typically becomes less attractive in a fast paced semiconductor manufacturing environment. These problems may be addressed by an improved system and method for testing wireless devices. In an improved method and system for testing a transceiver device having a transmitter and a receiver, an output of the transmitter is adjusted and looped back as an input to the receiver. The loop back signal is adjusted to match frequency and power characteristics of the receiver.

According to one embodiment, in a method and system for testing a transceiver communication device operating in a test mode, a transmitter output signal generated by a transmitter is adjusted and provided as a loop back to a receiver. The adjustment includes shifting a frequency and attenuating amplitude of the transmitter output signal to substantially match a predefined frequency and a predefined amplitude of a receiver input signal received by the receiver. A pass or fail status of the device is determined by comparing transmitted and received data.

As described earlier, regardless of the standard used, wireless devices such as RF transceivers typically operate in certain predefined frequency spectrum. For example, a mobile phone that is compliant with the GSM 900 technical standard uses a radio transceiver operating in a 900 megahertz (MHz) radio frequency band. The GSM 900 standard defines two 25 MHz bands for the uplink (transceiver transmit) and downlink (transceiver receive), and within this spectrum multiple 200 kilohertz (KHz) communication channels are allocated. The uplink and downlink are separated by a 45-MHz spacing. Specifically, the frequency band used is 890-915 MHz (mobile transmit) and 935-960 MHz (base transmit). To allow maximum number of users access, each band is subdivided into 124 carrier frequencies spaced 200 kHz apart, using Frequency Division Multiple Access (FDMA) techniques. Each of these carrier frequencies is further subdivided into time slots using Time Division Multiple Access (TDMA). TDMA has 8 time slots (e.g., each slot transmitting for one eighth of the time).

The standards also typically define power levels for transmit and receive signals to maintain desired signal strength and/or quality of service (QOS). The QOS may be defined by a maximum allowable bit error rate (BER) for the RF signal. For example, according to the Bluetooth standard in a modulated RF input signal at −70 decibel milliwatts (dBm) power level, the data output of the receiver may not have a bit error rate (BER) exceeding $10^{-3}$. The GSM standard defines five classes of mobile stations according to their peak transmitter power, e.g., 20, 8, 5, 2, and 0.8 watts. To minimize co-channel interference and to conserve power, both the mobiles and the Base Transceiver Stations (BTS) operate at the lowest possible power level while maintaining an acceptable signal strength and QOS. Power levels may be stepped up or down by adjusting an amplitude of the signal in steps of 2 dB from the peak power for the class down to a minimum of 13 dBm (20 milliwatts).

FIG. 1 illustrates a block diagram of a test system 100, according to an embodiment. In the depicted embodiment, a low cost tester 110 generates a plurality of test signals 140. A test load board 102 is coupled in between the tester 110 and a plurality of devices under test, including a first device under test (DUT1) 170 and a second device under test (DUT2) 180. That is, the plurality of test signals 140 are communicated to/from the DUT1 170 and DUT2 180 via the test load board 102. In the depicted embodiment, the plurality of test signals 140 may be optionally received from an external source.

In a particular embodiment, the tester 110 includes an arbitrary wave generator (AWG) and/or a digital source operable to generate various well known test signal types. Test signal types may include alternating current (AC) and/or direct current (DC), analog and/or digital, time and/or frequency, synchronous and/or asynchronous, pulse, clock and similar others. In a particular embodiment, the tester 110 may include or exclude RF test signals. The AWG generated plurality of test signals 140 may include an I/Q modulated test signal received as a baseband input, where 'I' is the in-phase component 142 of the signal, and 'Q' represents the quadrature component 144 at exactly 90° phase offset. The digital source may be used to generate the digital base band input.

In the depicted embodiment, the plurality of test signals 140 are provided to DUT1 170 and to DUT2 180, which are coupled in parallel thereby enabling simultaneous testing of the two devices. In a particular non-depicted embodiment, additional DUT's may be coupled in parallel to facilitate multi-site simultaneous testing. In the depicted embodiment, the DUT1 170 and DUT2 180 each include a corresponding wireless RF transceiver device 172 and 182. In a particular embodiment, each one of the first and second transceivers 172 and 182 has a selectable predefined frequency within the allowable frequency band and power characteristics based on the standard of compliance. That is, a first transmitter output 176 and a second transmitter output 186 corresponding to the DUT1 170 and DUT2 180 have a predefined output frequency within the band and a predefined amplitude band for the output power characteristics. Similarly, a first transmitter input 178 and a second transmitter input 188 corresponding to the DUT1 170 and DUT2 180 have a predefined input frequency within the band and a predefined amplitude band for the input power characteristics.

A reference crystal 120 generates a clock signal having a predefined frequency. A first divider 122 divides the clock signal from the reference crystal 120 and generates a reference clock signal 132, which is provided to the DUT1 170 and DUT2 180. A second divider 124 divides the clock signal received from the reference crystal 120 and generates a second reference clock signal 134 having a predefined frequency such as approximately 10 MHz. The particular value of the predefined frequency selected within the allowable frequency band may be dependent on the particular communication standard selected. Similarly, the particular value of the predefined amplitude selected within the allowable power range may also be dependent on the communication standard.

The second reference clock signal 134 is used as input by a RF source 150 to generate an RF test signal 152 as an output. A RF frequency of the RF test signal may be selectable to be approximately 100 KHz, a few GHz, or greater. The upper range for the RF frequency may be application and/or technology dependent. Presently, the high-end frequency for the RF frequency is approximately several tens of gigahertz. The RF source 150 is phase locked together with the tester 110. A first loop back circuit 174 and a second loop back circuit 184 corresponding to each one of the devices under test DUT1 170 and DUT2 180 provide a loop back signal from the first transmitter output 176 into the first receiver input 178 and the second transmitter output 186 into the second receiver input 188. The first loop back circuit 174 and the second loop back circuit 184 continually converts or adjusts the corresponding transmitter output signals 176 and 186 to substantially match the input frequency band and input power characteristics of the corresponding receiver.

In the depicted embodiment, the first loop back circuit 174 includes a first RF mixer 154 to perform the matching of the input frequency band and a first attenuator 162 to perform the matching of the input power characteristics of the receiver. The first RF mixer 154 converts RF power at one frequency into power at another frequency. In a particular embodiment, the first RF mixer 154 mixes, combines or converts the first transmitter output 176 having a selectable predefined frequency $f_{TXOUT}$ with a local oscillator (LO) signal 152 received from the RF source 150 and having a frequency $f_{LO}$ to generate a first shifted frequency output signal 166 having a frequency $f_{RXIN}$. The mixing of the frequencies is controlled (plus or minus) by adjusting an opening and closing of a first switch 136. That is, the frequency mismatch between the transmitter and receiver frequency is adjusted by adjusting $f_{LO}$ as described in Equation 100.

$$f_{RXIN} = f_{TXOUT} \pm f_{LO} \qquad \text{Equation 100}$$

Additional filtering may be used to select the desired frequency $f_{RXIN}$ and reject the unwanted frequency.

When the transmit power is higher than the receive power in a wireless transceiver, the power range mismatch between the transmitter and receiver is adjustable by the first attenuator 162. The first attenuator 162 is operable to reduce the power level of the first shifted frequency output signal 166 by a certain amount (gain), preferably with little or no signal reflections. In a particular embodiment, the first attenuator 162 is programmable and the gain factor to correct the mismatch may be programmed. In a non-depicted exemplary embodiment, in applications where the transmit power is lower than the receive power the power range mismatch may be adjusted by an amplifier device.

A first RF transformer 112 (balun) may be used for single ended to differential input/output matching. That is, the first attenuator 162 output having the selectable predefined frequency $f_{RXIN}$, the predefined amplitude (and the predefined power level) is converted from a single ended signal to the differential signal for the first receiver input 178.

In the depicted embodiment, similar to the first loop back circuit 174, the second loop back circuit 184 includes a second RF mixer 156 to perform the matching of the input frequency band and a second attenuator 164 to perform the matching of the input power characteristics of the second receiver. The second RF mixer 156 converts RF power at one frequency into power at another frequency. In a particular embodiment, the second RF mixer 156 mixes, combines or converts the second transmitter output 186 having a selectable predefined frequency $f_{TXOUT}$ with the local oscillator (LO) signal 152 received from the RF source 150 and having a frequency $f_{LO}$ to generate a second shifted frequency output signal 168 having a frequency $f_{RXIN}$. The mixing of the frequencies is controlled (plus or minus) by adjusting an opening and closing of a second switch 138. That is, the frequency mismatch between the transmitter and receiver frequency is adjusted by adjusting $f_{LO}$ as described in Equation 100. Additional filtering may be used to select the desired selectable frequency $f_{RXIN}$ and reject the unwanted frequency.

When the transmit power is higher than the receive power in a wireless transceiver, the power range mismatch between the transmitter and receiver is adjustable by the second attenuator 164. The second attenuator 164 is operable to reduce the power level of the second shifted frequency output signal 168 by a certain amount (gain), preferably with little or no signal reflections. In a particular embodiment, the second attenuator 164 is programmable and the gain factor to correct the mismatch may be programmed. In a non-depicted exemplary embodiment, in applications where the transmit power is lower than the receive power the power range mismatch may be adjusted by an amplifier device.

A second RF transformer 114 (balun) may be used for single ended to differential input/output matching. That is, the second attenuator 164 output having the predefined frequency $f_{RXIN}$, the predefined amplitude (and the predefined power level) is converted from a single ended signal to the differential signal for the second receiver input 188.

A first digitizer module 192 is configured to capture, analyze and/or store test data acquired at a first base band output 116 of the DUT1 170. Similarly, a second digitizer module 194 is configured to capture and analyze test data acquired at a second base band output 118 of the DUT2 180. The first and second base band outputs 116 and 118 may include analog and/or digital data. In a particular embodiment, a third divider 126 provides a synchronization signal to the first digitizer module 192 using the reference crystal 120. In a particular embodiment, a pass or fail status of the DUT1 170 and/or DUT2 180 is determined by comparing transmitted and received data. In an embodiment, the comparison may include computing a bit error rate (BER) for the received data. The DUT1 170 and/or DUT2 180 may be determined to be passed or failed if the BER is less than a predefined benchmark.

To further improve the operation of the test system 100, the gain or loss calibration for the first and second loop back circuits 174 and 184 may be verified with test tools such as spectrum analyzers or other bench setups. In addition, traces and layout for the loop back circuits 174 and 184 may be shortened by impedance matching to reduce loss and reflection of RF signals, compared to using long cables and other RF expensive components of a traditional RF tester. In a particular embodiment, the test load board 102 may be used to mount components/modules of the test system 100 such as the DUT1 170 and DUT2 180, the RF source 150, the first and second loop back circuits 174 and 184, dividers 122, 124 and 126, and the reference crystal 120 to minimize cost and reduce losses compared to a traditional RF tester.

In a particular embodiment, the DUT1 170 and/or the DUT2 180 is one of a microprocessor, a digital signal processor, a radio frequency IC, a microcontroller and/or a combination thereof. In an exemplary non-depicted embodiment, the DUT1 170 and/or the DUT2 180 may be a portable electronic device, such as a personal communications device, a personal entertainment device, a notebook computer and/or a combination thereof.

Figure 2:
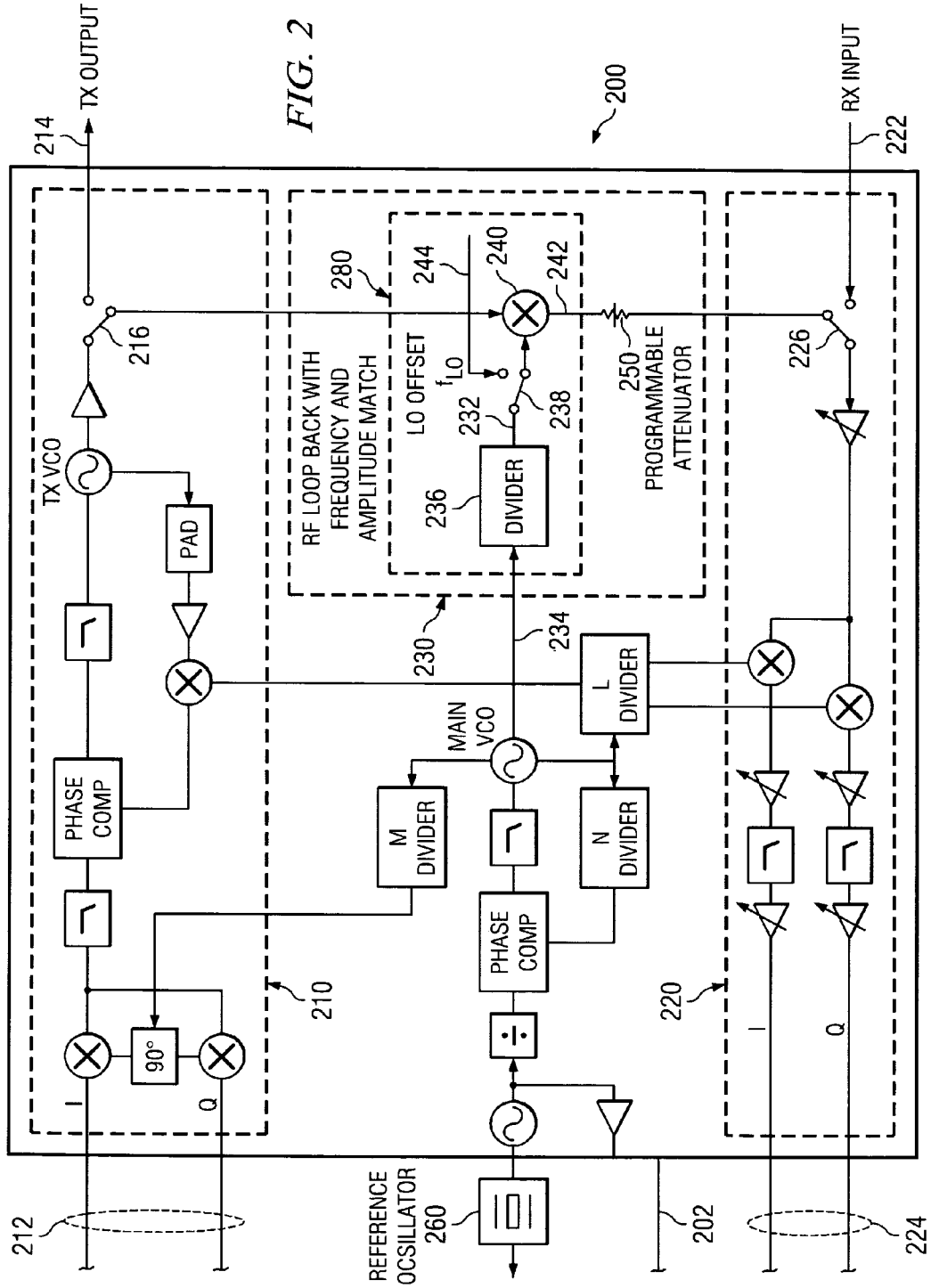
FIG. 2 illustrates a block diagram of a transceiver with a built in self test (BIST) circuit for RF testing, according to an embodiment.

FIG. 2 illustrates a block diagram of a transceiver 200 having a built in self test (BIST) circuit for RF testing, according to an embodiment. In the depicted embodiment, the transceiver 200 includes a transmitter circuit 210 having a transmitter input 212 and a transmitter output 214, and a receiver circuit 220 having a receiver input 222 and a receiver output 224.

The transceiver 200 is operable to be placed in a plurality of operating modes such as a normal mode, a test mode, a debug mode, a low power mode, transmit mode, receive mode, and similar others. In a particular embodiment, the transceiver 200 receives a data input 202 indicative of a target mode of operation. In a particular embodiment, the transceiver 200 may be programmed and/or configured to be placed in the test mode thereby automatically conducting a built-in self test to test the RF components of the chip. The transceiver 200 includes a first switch 216 and a second switch 226 which are responsive to a change of mode such as from a normal mode to a test mode of operation and from a test mode to a normal mode of operation. When placed in the test mode, the switches 216 and 226 provide a loop back path from the transmitter output 214 to the receiver input 222 by activating a BIST circuit 230. During a normal mode of operation of the transceiver 200, the switches 216 and 226 are operable to disconnect the BIST circuit 230, thereby disabling the loop back path.

In a particular embodiment, the transceiver 200 including the BIST circuit 230 is implemented as a stand-alone chip. In an exemplary non-depicted embodiment, the transceiver 200 may be integrated as a part of a larger integrated circuit device such as a microprocessor, a digital signal processor, a radio frequency IC, a microcontroller and/or a combination thereof. In an exemplary non-depicted embodiment, the transceiver 200 may be included in a portable electronic device, such as a personal communications device, a personal entertainment device, a notebook computer and/or a combination thereof.

In a particular embodiment, the BIST circuit 230 is substantially the same as the first loop back circuit 174 and the second loop back circuit 184 as described in FIG. 1. In the test mode, the BIST circuit 230 continually converts or adjusts a transmitter output signal provided at the transmitter output 214 to substantially match the predefined input frequency within the allowable band and input power characteristics of the receiver 220.

In the depicted embodiment, the BIST circuit 230 includes a frequency shift circuit 280 to perform the matching of the input frequency within the band and an attenuator 250 to perform the matching of the input power characteristics of the receiver 220. The frequency shift circuit 280 includes a RF mixer 240 to convert RF power at one frequency into power at another frequency, a divider 236 and a switch 238. In a particular embodiment, the RF mixer 240 mixes, combines or converts the transmitter output signal at the transmitter output 214 having a selectable predefined frequency $f_{TXOUT}$ with a local oscillator (LO) signal 232 having a frequency $f_{LO}$ to generate a shifted frequency output signal 242 having a frequency $f_{RXIN}$. The LO signal 232 is provided by the divider 236 by dividing the signal frequency output of a voltage controlled oscillator (VCO) 234 included within the chip. In an alternative embodiment, the switch 238 is operable to select one of the local oscillator (LO) signal 232 from the divider 236 or an external RF source 244 such as the RF source 150 as described in FIG. 1. The frequency $f_{LO}$, which is indicative of the frequency mismatch between the transmitter and receiver frequency, is adjusted as described in Equation 100.

In the depicted embodiment, a reference oscillator 260 provides a clock signal to the VCO 234. In an exemplary, non-depicted embodiment, the reference oscillator 260 may be internal to the transceiver 200. Additional filtering may be used to select the desired frequency $f_{RXIN}$ and reject the unwanted frequency. In a particular embodiment, if the transmit frequency $f_{TXOUT}$ is substantially the same as the frequency $f_{RXIN}$ then the presence of the frequency shift circuit 280 including the mixer 240 may be optional and may be bypassed. If the transceiver 200 operates asynchronously in transmit and receive, the mixer 240 may adjust the frequency $f_{RXIN}$ to be within a known frequency difference or be the same.

When the transmit power is higher than the receive power in a wireless transceiver, the power range mismatch between the transmitter and receiver is adjustable by the attenuator 250. In a particular embodiment, the attenuator 250 is substantially the same as the first attenuator 162 and the second attenuator 164 described in FIG. 1. That is, the attenuator 250 is operable to reduce the power level of the shifted frequency output signal 242 by a certain amount (gain), preferably with little or no signal reflections. In a particular embodiment, the attenuator 250 is programmable and the gain factor to correct the mismatch may be programmed. In a non-depicted exemplary embodiment, in applications where the transmit power is lower than the receive power the power range mismatch may be adjusted by an amplifier device.

In an exemplary, non-depicted embodiment, a digitizer module may be configured to capture, analyze and/or store test data, which may include analog and/or digital data, provided to the transmitter input 212 and acquired at the receiver output 224. In a particular embodiment, a pass or fail status of the transceiver 200 is determined by comparing transmitted and received data. In an embodiment, the comparison may include measuring a bit error rate (BER) for the received data. The transceiver 200 may be determined to be passed or failed if the BER is less than a predefined benchmark.

In the depicted embodiment, the transmitter 210 and the receiver 220 may also include other well known RF circuit components such as phase locked loops, voltage controlled oscillators, local oscillators, band pass filters, dividers, mixers, variable gain amplifiers, power amplifiers and low noise amplifiers.

Figure 3A:
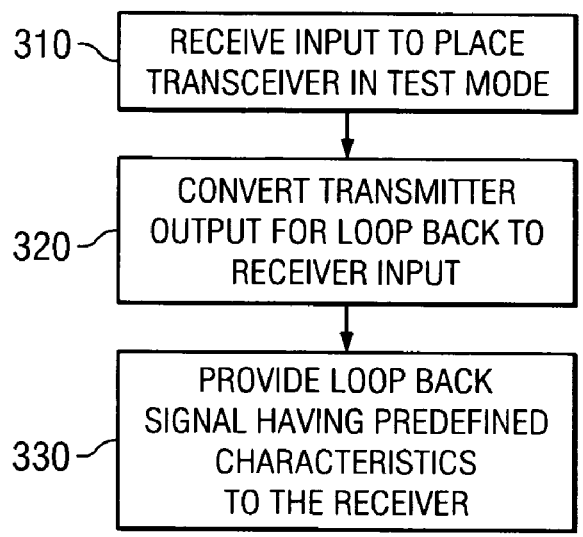
FIG. 3A is a flow chart illustrating a method of testing a transceiver device having a transmitter and receiver, according to an embodiment.

FIG. 3A is a flow chart illustrating a method of testing a transceiver device having a transmitter and a receiver, according to an embodiment. In a particular embodiment, the transceiver device is the transceiver 200 described in FIG. 2. At step 310, an input is received to place the transceiver device in a test mode. At step 320, a transmitter output signal is converted to substantially match characteristics of an input receiver signal such substantially matching a predefined frequency and a predefined amplitude of the input receiver signal. At step 330, the receiver input signal having the predefined frequency and the predefined amplitude is provided to the receiver.

Various steps described above may be added, omitted, combined, altered, or performed in different orders. For example, the step 320 to convert the transmitter output signal for loop back to the receiver input signal may include performing two additional steps as described in FIG. 3B.

Figure 3B:
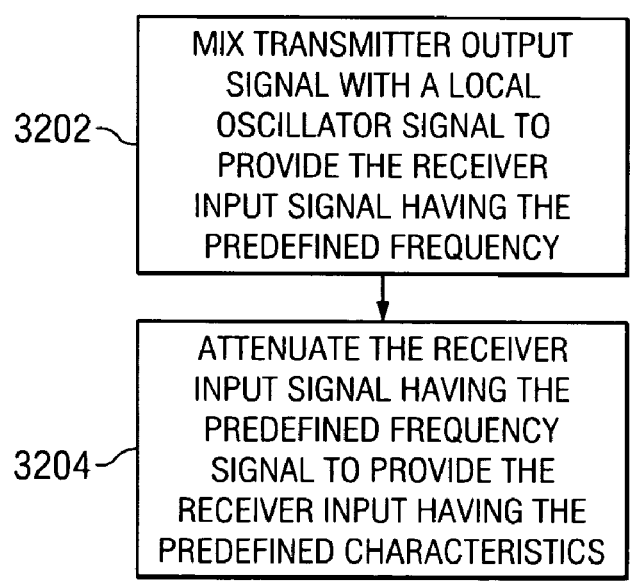
FIG. 3B is a flow chart illustrating a method of converting a signal for loop back, according to an embodiment.

FIG. 3B is a flow chart illustrating a method of converting a signal for loop back, according to an embodiment. At step 3202, the transmitter output signal is mixed with a local oscillator signal to provide the receiver input signal having the predefined frequency. At step 3204, the receiver input signal having the predefined frequency is attenuated to provide the receiver input signal having the predefined frequency and the predefined amplitude.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, although the disclosure is described in the context of a wireless circuit, this disclosure is not limited to use with wireless devices; rather, it envisions use of a wired and/or wireless transceiver device for rapid RF testing in a manufacturing environment.

While the description focuses on radio devices based on the GSM standard, the present disclosure is applicable in other frequency bands using other technical standards, including proprietary standards. Therefore, the discussion should not be construed as limiting the present invention to GSM transceivers. For example, the present invention has application in global positioning systems (GPS), low-earth orbit satellite system based communications systems, geographic area wide wireless networks and other cellular based communications systems. The cellular based systems may include first, second, and third generation (and beyond) digital phone systems, time-division multiple access (TDMA), code-division multiple access (CDMA), Bluetooth technology along with other digital communications technologies operating at various carrier frequencies. Additionally, as described above, the transceiver device described in the present disclosure has application in wired transceivers as well.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A transceiver communication device comprising:
   a transmitter configured to provide a transmitter output signal;
   a receiver configured to selectively receive a receiver input signal, wherein the receiver input signal has a predefined frequency and a predefined amplitude, wherein the predefined frequency is selectable over a range of receive frequencies and the predefined amplitude is selectable over a range of receive amplitudes; and
   a built in self test (BIST) circuit operable in a test mode to receive the transmitter output signal and provide the receiver input signal.

2. The device of claim 1, wherein the BIST circuit includes:
   a frequency shift circuit operable to receive the transmitter output signal and provide a frequency shifted output signal having a frequency substantially matching the predefined frequency; and
   an attenuator circuit operable to receive the frequency shifted output signal and provide the receiver input signal.

3. The device of claim 2, wherein the attenuator circuit adjusts an amplitude of the frequency shifted output signal to substantially match the predefined amplitude.

4. The device of claim 2, wherein the attenuator circuit is programmable to automatically adjust an output power of the transmitter output signal to substantially match a predefined input power of the receiver input signal.

5. The device of claim 2, wherein the frequency shift circuit is bypassed when a frequency of the transmitter output signal is substantially the same as the predefined frequency.

6. The device of claim 2, wherein the frequency shift circuit includes:
   a frequency divider circuit operable to divide a frequency of an oscillator input signal by a predefined factor to provide a predefined local oscillator output signal; and
   a mixer circuit operable to combine the transmitter output signal and the predefined local oscillator output signal to provide the frequency shifted output signal.

7. The device of claim 6, wherein the frequency shift circuit further includes:
   a selector circuit operable to select one of the predefined local oscillator output signal or an external local oscillator signal, wherein the external local oscillator signal when combined with the transmitter output signal provides the frequency shifted output signal.

8. The device of claim 1, wherein the BIST circuit is activated in the test mode and bypassed in a normal operating mode.

9. The device of claim 1, wherein the device is included in a portable electronic device, wherein the portable electronic device is one of a personal communications device, a personal entertainment device, and a notebook computer or a combination thereof.

10. The device of claim 1, wherein the device is one of a microprocessor, a digital signal processor, a radio frequency integrated circuit, and a microcontroller.

11. The device of claim 1, wherein the transmitter output signal and the receiver input signal are communicated via a wireless media when the BIST circuit is bypassed in a normal operating mode.

12. The device of claim 1, wherein the device is tested without an external radio frequency test signal source.

13. The device of claim 1, wherein the BIST circuit is placed in the test mode in response to receiving a test mode input signal, wherein placing the BIST circuit in the test mode enables a plurality of switches to loop back the transmitter output signal provided by an output of the transmitter to an input of the receiver.

14. A test system comprising:
   a tester to provide a plurality of test signals;
   a device under test (DUT) to receive the plurality of test signals, wherein the DUT includes a transceiver for providing a transmitter output signal and for receiving a receiver input signal, wherein the receiver input signal has a selectable predefined frequency and a selectable predefined amplitude; and
   a loop back circuit to receive the transmitter output signal and receive a local oscillator signal to provide the receiver input signal.

15. The system of claim 14, wherein the DUT is one of a microprocessor, a digital signal processor, a radio frequency integrated circuit, and a microcontroller.

16. The system of claim 14, wherein the loop back circuit includes:
   a mixer operable to combine the transmitter output signal and the local oscillator signal to provide a frequency shifted output signal having a frequency substantially matching the selectable predefined frequency; and
   an attenuator operable to receive the frequency shifted output signal and provide the receiver input signal.

17. The system of claim 14, comprising:
   another device under test (ADUT) to receive the plurality of test signals, wherein the ADUT includes another transceiver for providing another transmitter output signal and for receiving another receiver input signal having another selectable predefined frequency and amplitude; and another loop back circuit to receive the another transmitter output signal and the local oscillator signal to provide the another receiver input signal.

18. A method of testing a transceiver device having a transmitter and a receiver, the method comprising:
- receiving an input to place the device in a test mode, wherein the test mode enables a loop back of a transmitter output signal to a receiver input signal;
- converting the transmitter output signal to substantially match the receiver input signal having a predefined frequency and a predefined amplitude; and
- providing the receiver input signal having the predefined frequency and the predefined amplitude to the receiver.

19. The method of claim 18, wherein the device is one of a microprocessor, a digital signal processor, a radio frequency integrated circuit, and a microcontroller.

20. The method of claim 18, wherein the converting comprises:
- mixing the transmitter output signal with a local oscillator signal to provide the receiver input signal having the predefined frequency; and
- attenuating the receiver input signal having the predefined frequency to provide the receiver input signal, wherein the receiver input signal has the predefined frequency and the predefined amplitude.

* * * * *